March 4, 1952  T. M. KNOWLAND ET AL  2,588,125
METHOD OF UNIFORMLY SPRAY COATING
Filed Dec. 8, 1949  4 Sheets-Sheet 1

Inventors:
Thomas M. Knowland,
Grosvenor D. Marcy,
by Kenway, Jenney, Witter & Hildreth Attorneys March 4, 1952 T. M. KNOWLAND ET AL 2,588,125
METHOD OF UNIFORMLY SPRAY COATING
Filed Dec. 8, 1949 4 Sheets-Sheet 4

Inventors:
Thomas M. Knowland,
Grosvenor D. Marcy,
by Kenway, Jenney, Witter & Hildreth
Attorneys

UNITED STATES PATENT OFFICE 2,588,125

METHOD OF UNIFORMLY SPRAY COATING

Thomas M. Knowland, Belmont, and Grosvenor D. Marcy, Newton Highlands, Mass., assignors to Boston Woven Hose and Rubber Company, Cambridge, Mass., a corporation of Massachusetts Application December 8, 1949, Serial No. 131,738

1 Claim. (Cl. 117—104)

This invention relates to the treating or coating of a surface uniformly with a liquid spray and more particularly to the producing of a uniform "spatter" coating in color on uncured rubber strips, mats and the like which are thereafter cured by vulcanization. The primary object of the invention resides in the production of a method whereby surfaces can be sprayed uniformly and continuously by mechanically controlled mechanism.

Liquids are commonly sprayed from a spray gun in a conical pattern that spreads out or diverges as the liquid leaves the gun. The distribution of the liquid and density of the spray over the pattern can be controlled within certain limits, especially in the area at the center which is quite uniform for about three-quarters of the total diameter of the sprayed pattern. The liquid distribution on the area outside this central portion however is progressively less dense from the central area to the outer margin of the pattern. A further object of our invention resides in the production of a method of so relatively moving the spray and the surface being sprayed that the less dense marginal portion of the spray overlaps a corresponding marginal portion of the surface area last previously sprayed and thereby results in coating the sprayed surface uniformly throughout its entire area.

The material sprayed is ordinarily in the form of a strip of substantial width and the uniform spraying thereof is accomplished by reciprocating the spray across the strip and simultaneously therewith continuously moving the strip longitudinally at a relative speed that effects the overlapping spraying of the less dense area in accordance with our invention.

These and other features of the invention will be best understood and appreciated from the following description of a preferred embodiment thereof selected for purposes of illustration and shown in the accompanying drawings wherein, Fig. 1 is a side elevation of a machine operated in accordance with our invention.

Figure 1:
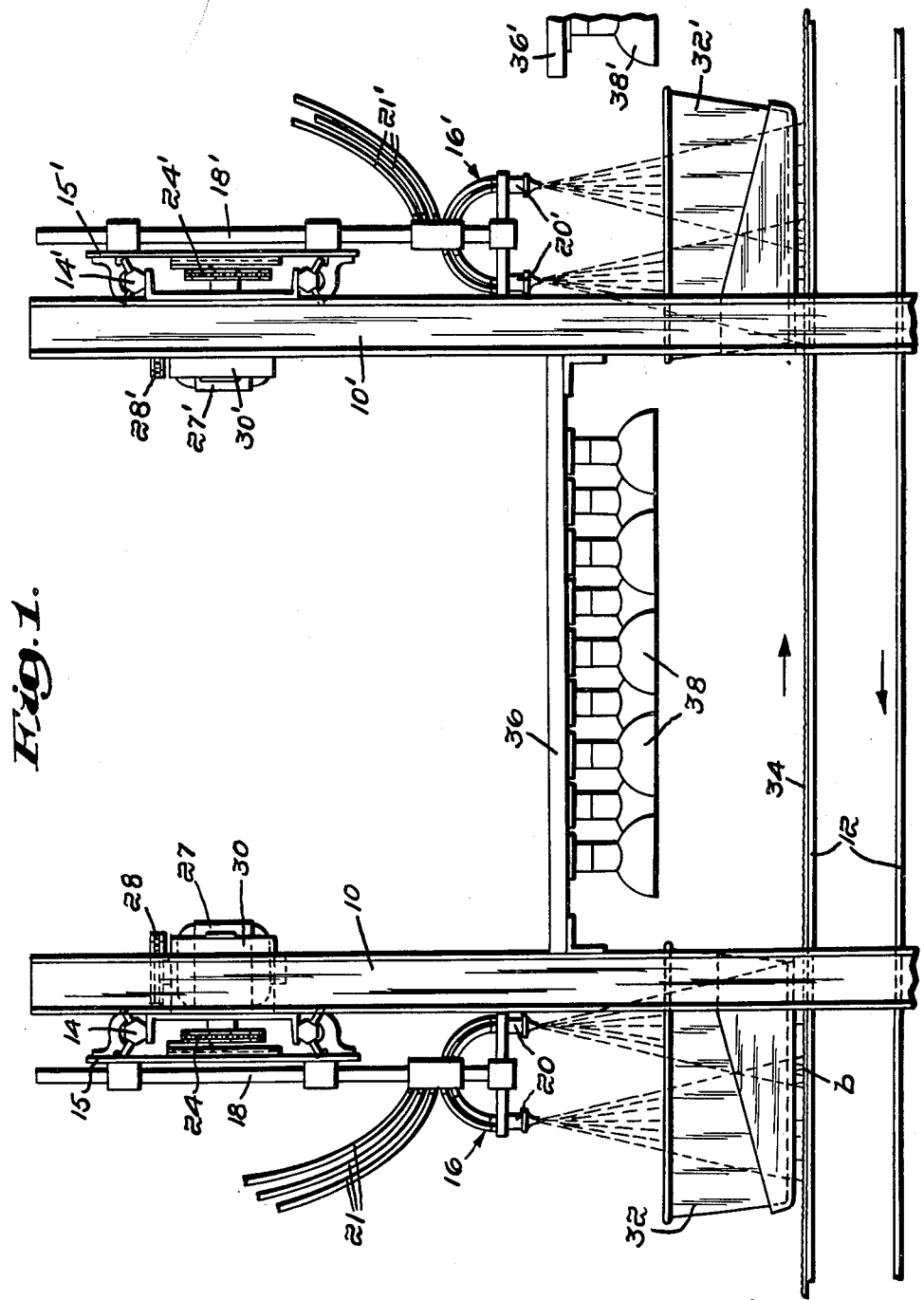
Figure 2:
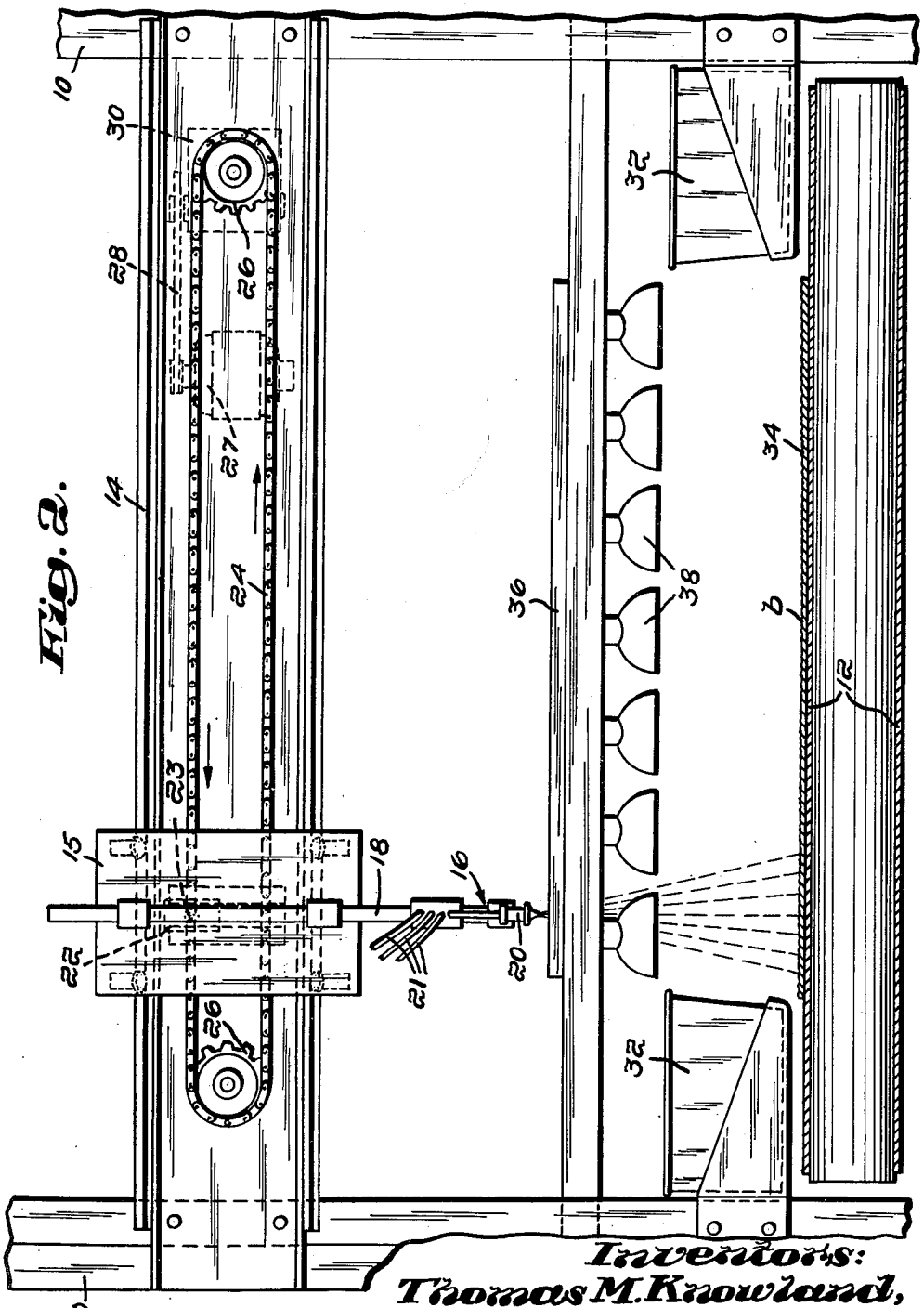
Fig. 2 is a front elevation thereof.
Figure 3:
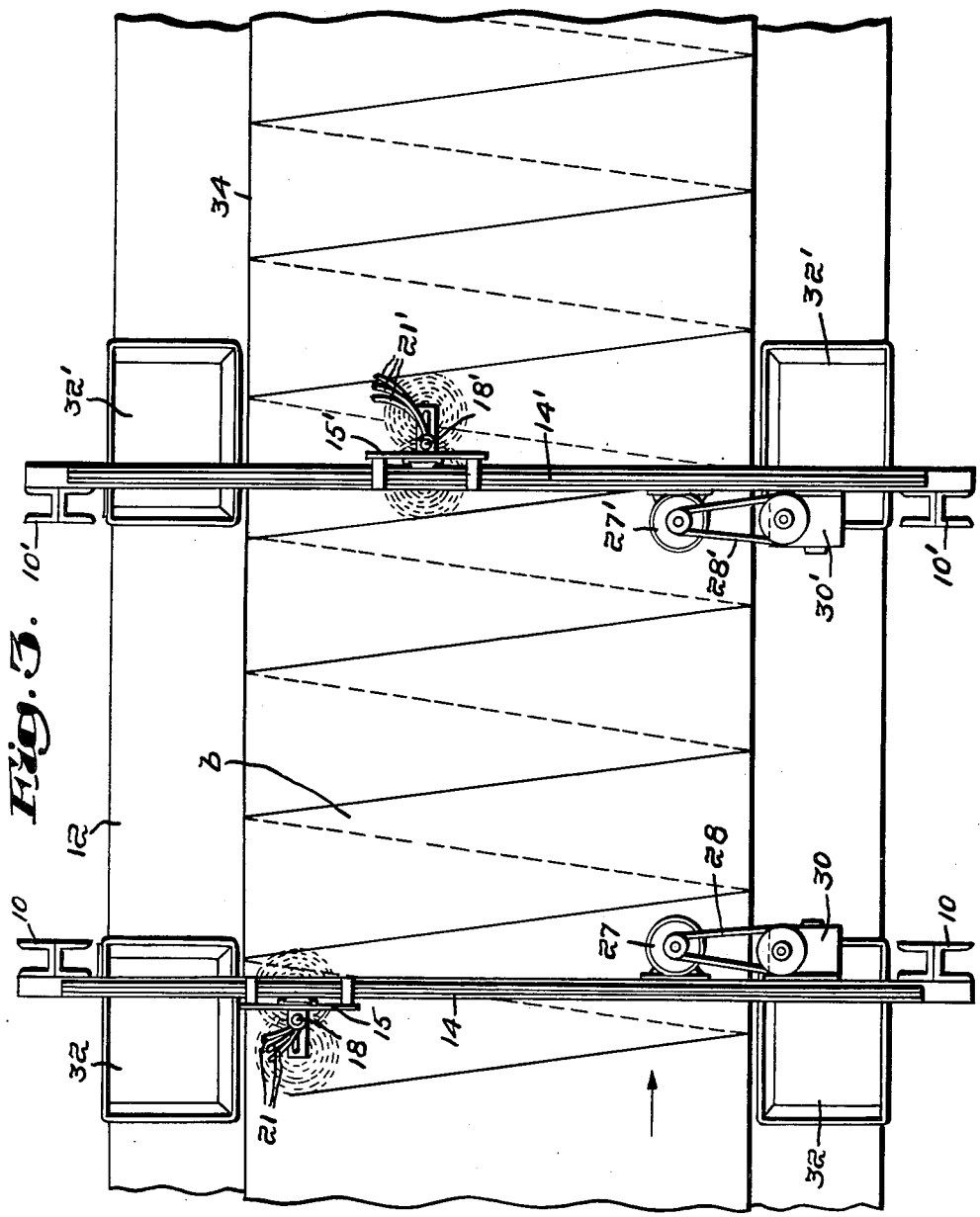
Fig. 3 is a plan view of the machine.

The machine shown in the drawings comprises a frame embodying opposing uprights 10 at opposite sides of an endless conveyor 12. A rail 14 supported at its ends on the uprights above the conveyor provides a track on which is slidably mounted a carriage 15. A spray gun 16 is mounted on the bottom end of a vertical post 18 carried by the carriage. The gun can include one or a plurality of spray nozzles. In the drawing we have illustrated two such nozzles 20 together with air and spray liquid hoses 21.

A vertical slide 22 in the carriage 16 is connected at 23 to an endless chain 24 supported on two sprockets 26. The sprockets and chain are driven by a motor 27 mounted on the rail and operated through a belt 28 and reduction gearing in a box 30. Mounted on the two uprights at opposite margins of the conveyor 12 and in line with the two nozzles 20 are two tanks 32 disposed respectively below the two sprockets 26. The strip 34 to be sprayed is carried on the top reach of the conveyor 12 beneath the spraying nozzles 20.

The conveyor 12 is operated by a motor (not shown) and this motor and motor 27 are synchronized to operate at such relative speeds as will move the strip 34 longitudinally and reciprocate the carriage 15 thereacross in the relation now to be described.

Figure 4:
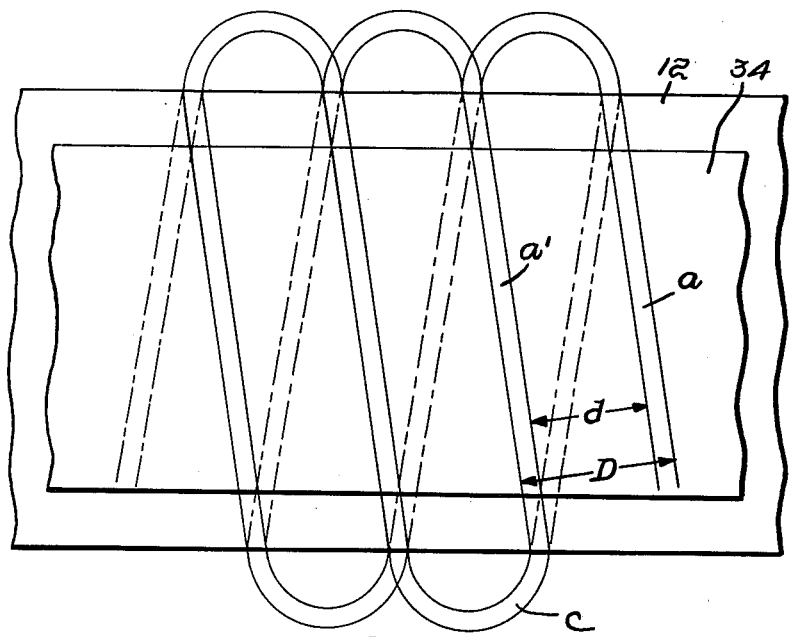
Fig. 4 is a fragmentary plan view of the surface being sprayed and illustrating the spraying paths extending transversely thereacross.

In Fig. 4 we have illustrated the traversing paths of the spray or sprays 20 relative to the longitudinally traveling strip 34. If a single spray 20 is employed the width of the spray pattern will be a distance D comprising an inner denser portion $d$ and two outer marginal portions $a$ and $a'$ of lighter density.

Figure 5:
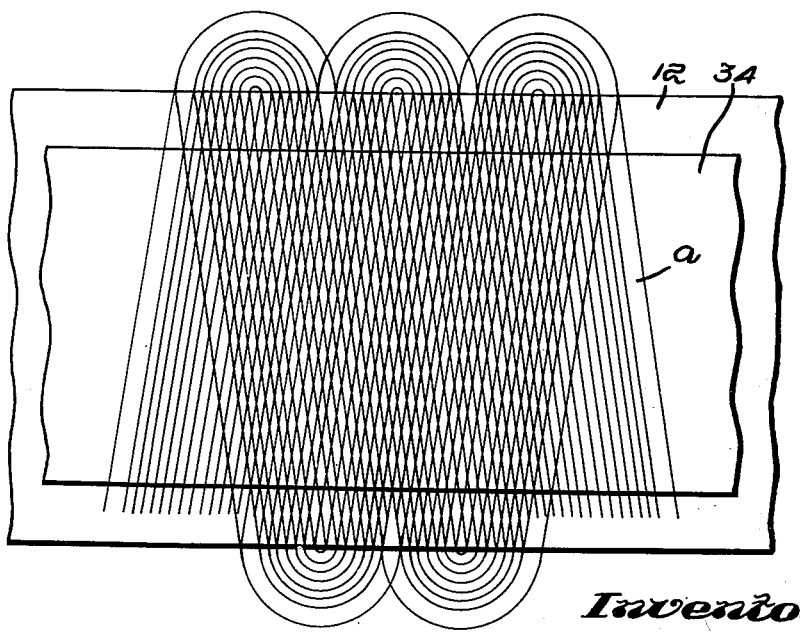
Fig. 5 is a like view showing the sprayed pattern produced by our invention.

Each nozzle 20 is adapted to spray a pattern of the nature illustrated in Fig. 5 and a path of width D when traversed across the strip 34. The distribution of the spraying liquid is such that the centrally disposed portion $d$ of the pattern is quite uniform and relatively dense as compared to the relatively narrow marginal portions at $a$ and $a'$ and in accordance with our invention the less dense marginal portions are overlapped or resprayed to make these surfaces uniform with the relatively denser inner portion $d$. When a plurality of nozzles 20 are employed they are so disposed that the marginal portions $a$ and $a'$ of the sprays overlap along the spraying path as shown at $b$ in Fig. 1.

As the spray is reciprocated, the strip is moved longitudinally a distance represented by the formula $$D - \left(\frac{D-d}{2}\right)$$

during and simultaneously with each complete traversing and return cycle of the spray across the strip. Thus as the spray moves forwardly across the strip in the full line path shown at the extreme right in Fig. 4 it sprays a uniformly dense portion $d$ and two marginal portions $a$ and $a'$ of lighter density. When the spray has completed its forward and return cycle it is in position at $c$ to give the previously sprayed margin $a'$ a second light spray in its next forward traverse across the strip. The same relation prevails in the return paths indicated by the broken lines in Fig. 4. Thus the strip is automatically given a uniform overall spraying during its travel past the nozzles 20. It will be noted that when two or more nozzles are employed the adjacent marginal portions of the adjacent sprays are in overlapped relation transversely of the spraying path, as indicated at $b$ in Fig. 1, and the same formula $$D - \left(\frac{D-d}{2}\right)$$

relationship prevails, D indicating the width of the sprayed path.

The chain 24 is driven continuously in the direction of the arrows and is disposed to carry the nozzles to the two margins of the strip 34 as indicated in Fig. 5. The function of the tanks 32 is to receive that portion of the sprays extending beyond the side margins of the strip and, if desired, the spray guns may be set to cut off the spray momentarily at each end of the traverse. Thus the mechanism is set to give full spraying traverse across the strip with a minimum of waste and overtravel. In Fig. 5 we have illustrated the complete and uniform spraying pattern made on the strip 34 as it travels on the conveyor 12 past the sprays.

Our invention also contemplates a second spraying when required, such as the spraying of a different color liquid to produce contrasting color effects. To this end, we provide a second pair of uprights 10' and corresponding spraying parts of the nature already described and including the nozzles 20. The uprights 10' are spaced from the uprights 10 in the direction of travel of the strip 34. Disposed between the uprights 10 and 10' and hung from the frame 36 carried by the uprights above the strip are a plurality of heat producing lamps 38. The lamps are directed downwardly onto the strip and serve rapidly to dry the coating sprayed by the nozzles 20. The dried coating thereafter passes with the strip beneath the nozzles 20' and is given a second spraying in the manner already described relative to the nozzles 20. Like parts for the second spraying are indicated on the drawings by like reference characters primed.

It will now be apparent that we have produced a novel method of overall spraying a continuously traveling surface uniformly and have thereby eliminated the variations and relatively light and dense areas which result from ordinary spraying in the usual manner.

Having thus disclosed our invention what we claim as new and desire to secure by Letters Patent is:

A method of uniformly coating the top surface of a mat strip or the like with a diverging liquid spray reciprocated thereacross and spraying thereonto a path of D-width having a uniformly dense inner portion of $d$-width more concentrated than the marginal portions disposed outwardly thereof, said spray including two conical diverging sprays each having a uniformly dense inner portion more concentrated than the peripheral portion disposed outwardly thereof and with said two conical diverging sprays directed onto said surface in patterns disposed laterally adjacent to each other longitudinally of the strip and with their adjacent said peripheral portions in overlapped relation in an area disposed centrally between the two patterns, which consists in continuously moving the strip in flat horizontal position at a uniform speed longitudinally in one direction along a predetermined path, simultaneously therewith projecting the spray onto the top surface of the strip in said path of D-width with said inner portion thereof disposed in a path of $d$-width, and continuously reciprocating the spray in a straight line across the strip at a uniform speed so synchronized with the longitudinal movement of the strip that one of said marginal portions of the spray overlaps the adjacent and corresponding marginal portion of the surface area sprayed by the previous crossing of the spray in the same direction and produces therewith a uniformly sprayed coating, said strip being moved longitudinally a distance $$D - \left(\frac{D-d}{2}\right)$$

during and simultaneously with each complete traversing and return cycle of the spray across the strip and the longitudinal axes of the diverging sprays being maintained perpendicular to said surface during the entire traversing of the spray across the strip.

THOMAS M. KNOWLAND.
GROSVENOR D. MARCY.

REFERENCES CITED

The following references are of record in the file of this patent:

UNITED STATES PATENTS

| Number | Name | Date |
|---|---|---|
| 1,956,220 | Johnson et al. | Apr. 24, 1934 |
| 2,061,107 | Schellenger | Nov. 17, 1936 |
| 2,118,212 | MacLaurin | May 24, 1938 |